United States Patent [19]
Schofield
[11] Patent Number: 4,709,153
[45] Date of Patent: Nov. 24, 1987

[54] INTRUDER DETECTOR

[75] Inventor: Roy A. Schofield, Darwen, England
[73] Assignee: Shorrock Security Systems Limited, Blackburn, England

[21] Appl. No.: 741,818
[22] Filed: Jun. 6, 1985
[51] Int. Cl.[4] .................... G01J 5/04
[52] U.S. Cl. .................... 250/353; 250/342
[58] Field of Search .................... 250/341, 342, 372, 353

[56] References Cited

U.S. PATENT DOCUMENTS

| | | | |
|---|---|---|---|
| 4,447,726 | 5/1984 | Mudge et al. | 250/342 |
| 4,460,829 | 7/1984 | Lettanni et al. | 250/342 |
| 4,484,075 | 11/1984 | Kahl, Jr. et al. | 250/342 |
| 4,507,654 | 3/1985 | Slolarczyk et al. | 340/545 |
| 4,529,881 | 7/1985 | Ceurvels et al. | 250/372 |
| 4,605,302 | 8/1986 | Lofgren et al. | 356/5 |

*Primary Examiner*—Carolyn E. Fields
*Assistant Examiner*—Richard Hanig
*Attorney, Agent, or Firm*—Ross, Ross & Flavin

[57] ABSTRACT

To monitor that infra-red radiation element 22 within housing 10 has not been disarmed, for instance by rendering opaque an infra-red transparent element 16 masking a window 12, in the housing 10, through which radiation may enter and be focussed by optical system 18 onto the element 22, an infra-red radiation generator 32 comprising a low-temperature lamp 34 is mounted externally of the housing 10 so that element 22 receives radiation therefrom and provides a signal to a processor 30. The latter will provide an alarm in the event of absence of radiation from the generator 32 and/or change in the radiation reaching the element 22 commensurate with approach of a person.

1 Claim, 2 Drawing Figures

INTRUDER DETECTOR

Figure 1:
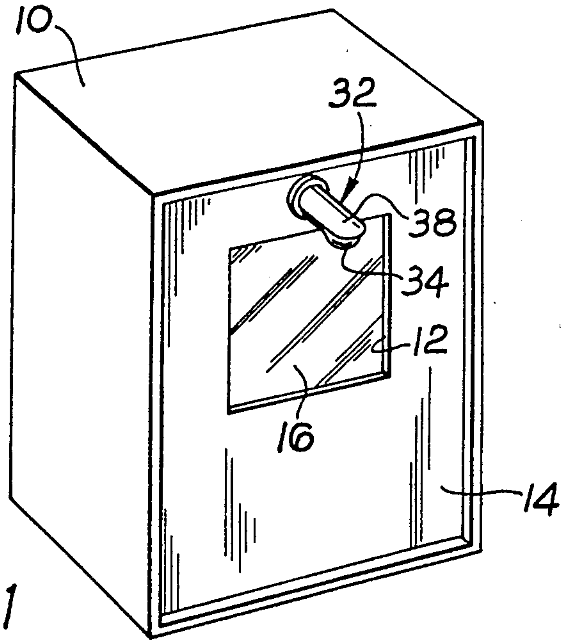

This invention concerns infra-red intruder detectors.

Infra-red intruder detectors in general are well known, and operate on the principle of detecting the infra-red radiation from the human body, which is at a different level from the natural background radiation. In practice, such a detector generally comprises a housing wherein is an optical system which serves to focus the radiation onto a detector element, as well as electronics signal processing means which serves to process any signal from the detector element resulting from detection of the approach of an intruder, for example to initiate an alarm.

Naturally, there must be some form of opening or window in the housing to permit the radiation to encounter the optical systems, and commonly such a window is covered with polythene to exclude dust. Polythene is transparent to the wavelength of the infra-red radiation from a human being, which is typically of the order of ten microns.

However, it is possible to disable such an intruder detector relatively easily, especially where the disabling is effected by some unscrupulous person who has authorised access to the detector when it is inoperative, for instance during working hours. Such disabling can very easily be effected, for instance, by spraying the polythene with a substance which is not transparent to infrared radiation, but which may not necessarily be noticed in the absence of close examination of the detector. Certain transparent hair lacquers could, for instance, be used in this way.

An object of this invention is to provide an infra-red detector of the kind above discussed which is so arranged that disabling thereof in the manner above discussed is not possible.

With this object in view, the present invention provides an infra-red intrusion detector comprising a housing having an opening or window for entry therein or infra-red radiation and having an optical system which serves to focus the infra-red radiation onto a detector element within the housing, characterised in that the detector further includes an infra-red source for providing an output at one or more appropriate wavelengths, and signal processing means effective to monitor said output so as to provide an alarm or malfunction signal in the event of the monitored output falling below a predetermined value or detection of the approach of an intruder.

The infra-red source may be provided by a unit fitted to the housing itself, or by a unit separate from and spaced away from the housing.

The invention will be described furher, by way of example, with reference to the accompanying drawings which illustrates a preferred embodiment thereof, the following description being illustrative and not restrictive, of the scope of the invention.

Figure 2:
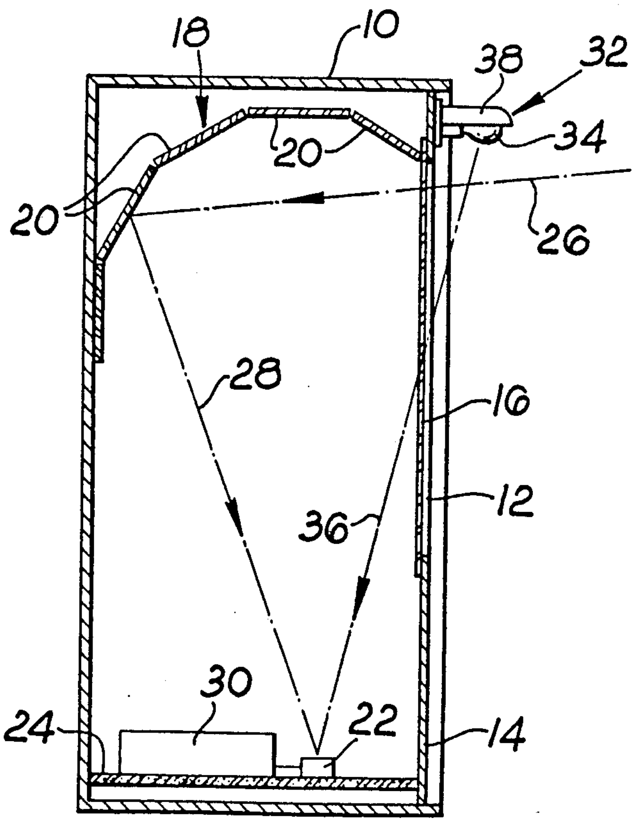

In the drawing:

FIG. 1 is a perspective view of a practical embodiment of the detector of the invention; and FIG. 2 is a diagrammatic sectional side elevation of the detector of FIG. 1.

The illustrated preferred practical embodiment of the intruder detector of the invention comprises a housing 10 having an opening or window 12 in its front panel 14, which opening or window 12 is masked by a polythene element or sheet 16 to prevent entry of dust or foreign matter into the housing 10.

Located immediately behind the window 12 is an optical system indicated generally by the reference numeral 18, and shown in the drawing, for the purposes of illustration, as consisting of a shaped array of mirrors 20, which will serve to focus any infra-red radiation, entering the housing 10 by way of the opening or window, onto an infra-red detector element 22 mounted upon a circuit board 24 fixed within the housing 10 as has been illustrated purely diagrammatically by the lines 26 and 28. The circuit board 24 has mounted thereon an electronic signal processor 30 coupled with the detector element 22 and having output means (not specifically shown) connectable, for instance, to an amplifier or other means for generating an alarm which may, of course, be installed at a location remote from the detector.

The optical system 18 may be different from that illustrated. For instance it may comprise one or more Fresnel lenses moulded into the polythene element or sheet 16 which masks the opening or window 12 which has the advantage of not requiring the use of a mirror system.

The front panel 14 of the housing 10 has fitted to it, outside the housing 10, an infra-red generator indicated generally by the reference numeral 32 and shown in the drawing, by way of example, as a low-temperature lamp 34, this being so disposed that radiation from it will pass continuously through the opening or window 12 to the detector element 22 as shown diagrammatically by the line 36. The lamp 34 is shown as having a shade 38 tending to reflect its radiation downwards, but this is not essential. The arrangement is advantageously such that the radiation from the generator 32 is modulated, thereby generating an individually recognisable signal, such as a continuous stream of pulses. The signal processor 30 is, of course, appropriately arranged to recognise this signal and under normal circumstances ignore its presence or filter it out, but on the other hand to recognise its absence.

The manner of operation of the detector of the invention, as above described, will readily be understood. In normal operation of the detector, the infra-red radiation from the constant source provided by the generator 32 is recognised, and so long as it does not fall below a predetermined level and does not cease, the detector will operate to detect the radiation arising from the approach of an intruder and generate an alarm. However, should there be any tampering with the opening or window 12, or the element or sheet 16 masking the same, such as to prevent or reduce significantly the radiation sensed continuously from the generator 32, the detector will generate an alarm or malfunction signal ensuring that steps are taken to eliminate the relative reason.

The invention is not confined to the precise details of the foregoing example, and variations may be made thereto. Thus, for example, the infra-red generator or source does not have to be integrated with or provide on the housing 10, but may be provided as a separate individual component or unit mounted in an appropriate disposition away from the housing 10.

I claim:

1. An infra-red intrusion detector for monitoring any unwanted disarming thereof and/or any approach of an intruder into the monitored area comprising:

a housing having an infra-red transparent window for the passage therethrough of infra-red radiation into the housing interior, an infra-red radiation detector within the housing, an optical means within the housing for providing an incidental output onto the detector by focussing the infra-red radiation arising from the approach of the intruder a modulated infra-red radiation generator means mounted externally of the housing for directing radiation through the window and for providing a normal recognizable radiation output onto the detector, signal processing means for monitoring the normal recognizable and incidental outputs on the detector insuring against disablement by any rendering of the window opaque to infra-red and for generating a signal in the event of the normal recognizable output from the detector falling below a pre-set value due to insufficient radiation reaching the detector from the modulated radiation generator and/or a change in the radiation reaching the detector commensurate with the approach of the intruder.

* * * * *